United States Patent [19]

Wood

[11] Patent Number: 5,061,434
[45] Date of Patent: Oct. 29, 1991

[54] NUCLEAR FUEL BODIES AND THE PRODUCTION THEREOF

[75] Inventor: Geoffrey A. Wood, Preston, United Kingdom

[73] Assignee: British Nuclear Fuels Inc., Warrington, United Kingdom

[21] Appl. No.: 571,162

[22] Filed: Aug. 23, 1990

[30] Foreign Application Priority Data

Sep. 6, 1989 [GB] United Kingdom ............... 8920112

[51] Int. Cl.$^5$ .............................................. G21C 19/00
[52] U.S. Cl. .................................. 376/261; 376/419; 376/421; 264/0.5
[58] Field of Search .............. 376/421, 422, 419, 261; 252/636; 264/0.5

[56] References Cited

U.S. PATENT DOCUMENTS

| 3,855,061 | 12/1974 | Triggiani et al. | 376/411 |
| 4,671,904 | 6/1987 | Dörr et al. | 264/0.5 |
| 4,749,529 | 6/1988 | Halldahl | 264/0.5 |
| 4,889,663 | 12/1989 | Michel | 264/0.5 |
| 4,921,531 | 5/1990 | Nagle et al. | 75/351 |
| 4,965,024 | 10/1990 | Wood | 264/0.5 |

FOREIGN PATENT DOCUMENTS 2177249  7/1985  United Kingdom .

Primary Examiner—Brooks H. Hunt
Assistant Examiner—Meena Chelliah
Attorney, Agent, or Firm—William R. Hinds

[57] ABSTRACT

A nuclear fuel body provided by doped uranium dioxide grains having kernels of undoped uranium dioxide. The body is produced by mixing single crystal seeds of uranium dioxide with doped uranium dioxide granules. The mixture is compacted and subsequently sintered. Gadolinia is a preferred dopant for the uranium dioxide.

9 Claims, No Drawings

NUCLEAR FUEL BODIES AND THE PRODUCTION THEREOF

This invention relates to nuclear fuel bodies and the production thereof.

According to an aspect of the invention, there is provided a method of producing a nuclear fuel body, the method comprising mixing single crystal seeds of uranium dioxide with granules comprising doped uranium dioxide, compacting the mixed seeds and granules, and sintering the compacted mixed seeds and granules whereby a nuclear fuel body is produced comprising doped uranium dioxide grains having kernels comprising undoped uranium dioxide.

Preferably, the doped uranium dioxide comprises $UO_2$-$Gd_2O_3$. An effect of the seed particles is to nucleate grain growth of the $UO_2$-$Gd_2O_3$.

Preferably, the sintering is performed in an environment comprising a reducing atmosphere.

The invention also includes a nuclear fuel body made by the method of the invention.

In one example of the invention, single crystal $UO_2$ seeds were obtained by the method described in European Patent Application No 88309519 (U.S. Pat. No. 4,965,024 and were added to $UO_2$ granules containing 8 w/o gadolinia. The seeds were mixed with the granules by stirring before being pressed into a body at approximately 4 t.cm$^{-2}$, the seed content being approximately 2% by weight. The seeded body was sintered in an atmosphere of wet hydrogen/nitrogen for 12 hours at 1720° C. The sintered body was subsequently examined with the results as follows: Density—98.3% (TD) average grain size (unseeded)—~38.6 microns average grain size (seeded)—~100 microns The seeds were found to have grown during sintering resulting in the unique microstructural feature of a gadolinia-free seed located at the centre of a $UO_2$-$Gd_2O_3$ grain. The $UO_2$ seed crystals had successfully nucleated grain growth in the $UO_2$-$Gd_2O_3$.

The $UO_2$ in the $UO_2$-$Gd_2O_3$ powder is preferably derived from the reaction of uranium hexafluoride with steam and hydrogen. See also British Patents Nos 1320137 and 2064503 (U.S. Pat. Nos. 3,845,193 and 4,397,824) which are incorporated by reference herein. Reference is also made to British Patent No 2177249 for further information on the use of seed crystals in nuclear fuel bodies.

It will be appreciated that the sintering may be performed in an alternative atmosphere such as carbon dioxide.

Although a 2 w/o seed content has been described, other contents such as 5 w/o may be used.

I claim:

1. A method of producing a nuclear fuel body, the method comprising mixing single crystal seeds of uranium dioxide with granules comprising doped uranium dioxide, compacting the mixed seeds and granules, and sintering the compacted mixed seeds and granules, whereby a nuclear fuel body is produced comprising doped uranium dioxide grains having kernels comprising undoped uranium dioxide.

2. A method as claimed in claim 1, wherein the doped uranium dioxide comprises $UO_2$-$Gd_2O_3$.

3. A method as claimed in claim 2 wherein the seeds comprise between 2 and 5% by weight of the mixed seeds and granules.

4. A method as claimed in claim 3, wherein the $Gd_2O_3$ comprises about 8% by weight of the $UO_2$-$Gd_2O_3$.

5. A method as claimed in claim 1, wherein the sintering is performed in an environment comprising a reducing atmosphere.

6. A method as claimed in claim 5, wherein the reducing atmosphere comprises wet hydrogen/nitrogen at about 1720° C.

7. A method of producing a nuclear fuel body, the method comprising obtaining single crystal uranium dioxide seeds, forming a mixture of the seeds with uranium dioxide granules doped with about 8% by weight gadolinia, the seed content in the mixture being about 2% by weight, pressing the mixture at about 4 t.cm$^{-2}$ to form a body, and sintering the body in an atmosphere of wet hydrogen/nitrogen for about 12 hours at about 1720° C., whereby a nuclear fuel body is produced comprising doped uranium dioxide grains having kernels comprising undoped uranium dioxide.

8. A nuclear fuel body made by the method of claim 1.

9. A nuclear fuel body made by the method of claim 7.

* * * * *

UNITED STATES PATENT AND TRADEMARK OFFICE
CERTIFICATE OF CORRECTION

PATENT NO. : 5,061,434

DATED : October 29, 1991

INVENTOR(S) : WOOD, GEOFFREY A.

It is certified that error appears in the above—identified patent and that said Letters Patent is hereby corrected as shown below:

On the Title page of the printed patent, the information page, under the heading "[73] Assignee" the name of the assignee is changed to --British Nuclear Fuels plc--.

Signed and Sealed this

Twenty-third Day of February, 1993

Attest:

STEPHEN G. KUNIN

*Attesting Officer*     Acting Commissioner of Patents and Trademarks